United States Patent

Ruokolainen et al.

[11] Patent Number: 5,900,158
[45] Date of Patent: May 4, 1999

[54] METHOD AND APPARATUS FOR THICKENING LIME MUD WITH A DISC FILTER

[75] Inventors: Pekka Ruokolainen, Savonlinna; Juha Titoff, Kerimäki, both of Finland

[73] Assignee: A. Ahlstrom Corporation, Noormarkku, Finland

[21] Appl. No.: 08/581,581

[22] PCT Filed: Jul. 12, 1994

[86] PCT No.: PCT/FI94/00320

§ 371 Date: May 20, 1996

§ 102(e) Date: May 20, 1996

[87] PCT Pub. No.: WO95/02442

PCT Pub. Date: Jan. 26, 1995

[30] Foreign Application Priority Data

Jul. 15, 1993 [FI] Finland ................................ 933212

[51] Int. Cl.⁶ ........................ B01D 37/02; B01D 33/06
[52] U.S. Cl. ........................ 210/772; 210/777; 210/780; 210/331; 210/332; 210/391; 210/396; 210/408
[58] Field of Search ................................ 210/772, 777, 210/778, 780, 330, 331, 332, 396, 391, 402, 406, 407–408

[56] References Cited

U.S. PATENT DOCUMENTS 2,839,194  6/1958  Lopker et al. .
3,521,751  7/1970  Holthuis .
4,943,372  7/1990  Kohonen .
5,149,448  9/1992  Mattelmaki .
5,759,397  6/1998  Larsson et al. ........................ 210/331

FOREIGN PATENT DOCUMENTS 9201541-1B  11/1993  Sweden ........................ B01D 33/77
WO 93/23140  11/1993  WIPO .
WO 94/23821  10/1994  WIPO .

*Primary Examiner*—Robert J. Popovics
*Attorney, Agent, or Firm*—Nixon & Vanderhye P.C.

[57] ABSTRACT

A method and apparatus thickens lime mud with a disc filter in such a way that the precoat layer on the filter surfaces of the disc filter can be cleaned. Beneath the scrapers for scraping a dry layer of lime sludge from the precoat layers on the disc filter wires surfaces one or more high pressure nozzles, and optionally a low pressure nozzle, are provided for directing jets of liquid at the precoat layer and wire surface. One high pressure nozzle may remove the precoat layer while another cleans the wire surface, and the nozzles may be reciprocated (with respect to the shaft for rotating the disc filters in a trough). The high pressure jets provide liquid at a pressure of about 30–100 bar, while the low pressure jet pressure is between 2–30 bar and may be utilized continuously, or arrested when the high pressure jets are operable.

25 Claims, 3 Drawing Sheets

METHOD AND APPARATUS FOR THICKENING LIME MUD WITH A DISC FILTER

CROSS-REFERENCE TO RELATED APPLICATION

This application is the U.S. national phase of International Application No. PCT/FI94/00320 internationally filed Jul. 12, 1994.

BACKGROUND OF THE INVENTION

The present invention relates to a method and apparatus for thickening lime mud by means of a disc filter. The invention also relates to a method of cleaning the filter sectors of a disc filter. The method and apparatus according to the invention are especially suitable for continuously renewing the precoat layer and/or washing the wire surfaces.

Prior to the lime reburning kiln, the lime mud having a dry solids content of about 25% is thickened usually to a dry solids content of about 70–85% by means of a drum vacuum filter. A so-called precoat filtering layer is formed on the surface of the filter drum by lime mud, the thickness of which is 10–20 mm. The lime mud thickened on the precoat is removed therefrom by means of a scraper, subsequent to which the lime mud falls on a conveyor belt, which then feeds the lime mud to a lime reburning kiln.

The surface layer of the precoat gets clogged while the filtering proceeds and must be removed from time to time. The technique normally used is to move the automatic scraper gradually inwards following a predetermined program, thus removing the clogged surface layer. After the scraper has moved in several steps closer to the drum the rest of the precoat is removed and a new precoat is formed.

All the movements of the scraper described above and the removal of the whole precoat from the surface of the drum cause disturbances in the operation of the lime mud reburning kiln. Every time the clogged surface layer of the precoat has been removed by means of the scraper the filtering is more efficient and the lime mud volume is larger for a moment Further, also the dry solids content of the lime mud is higher after the precoat has been scraped which results in and calls for changes in the operation of the lime mud reburning kiln. When the whole precoat is renewed at the same time, the supply of the mud into the kiln is stopped altogether for a moment, which naturally causes a break in the operation of the kiln. Typically, the precoat is renewed once a shift, or correspondingly three times in 24 hours. In the long run, the wire is also so badly clogged that it must be washed either with acid or with a high-pressure washer. This operation also causes a long disturbance or interrupts the production of the lime mud reburning kiln.

The arrangement disclosed in U.S. Pat. No. 5,149,448 reduces the disadvantages and problems of the known techniques described above by removing a strip at a time from the filtering layer by means of a liquid jet reciprocating continuously in the longitudinal direction of the drum. This has been effected by installing one nozzle or several nozzles under the scraper, continuously reciprocating in the longitudinal direction of the drum. The high-pressure nozzles, for example two in number, have been provided under the scraper so that the purpose of one of the nozzles is to break the precoat layer and to drop it to the filter vat after which the second nozzle is used to wash the filter cloth clean. The pressure of the water sprayed from the washing nozzles is approx. 50–100 bar which gives a very good cleaning result. The nozzle disperses the jets so that the precoat is removed and the wire washed from a strip of approx. 10–50 mm in width at a time.

According to the arrangement of the above US patent, the washing nozzles have been installed in a rack designed for this purpose for moving the nozzles sideways. The nozzles are moved continuously to and fro in the longitudinal direction of the drum thus continuously renewing the precoat and cleaning the filter cloth. The advantages provided by this kind of continuous high-pressure water scraping are:

the dry-solids content of the lime mud from the lime mud filter to the lime mud reburning kiln is continuously uniform which allows smooth running of the kiln;

change of the precoat is not needed as the precoat is renewed continuously a strip at a time; thus disturbances in the operation of the kiln due to a change of the precoat are avoided;

it is not necessary to interrupt the filtering operation for a wash of the wire.

According to the invention, the lime mud filtering by means of a disc filter is effected almost correspondingly: The lime mud is pumped via a feed duct or ducts into a dividing duct, wherein the lime mud is kept in a homogenous state by mixing means. From the dividing duct the lime mud is evenly distributed to the trough-like vats of the filtering means, i.e. the disc filters. In the vats, the lime mud is retained homogenous by mixing means located on the periphery of the filter discs In other words, the lime mud is prevented from thickening on the bottom of the vat with the above-mentioned mixing means.

Most usually, the filter discs rotate in atmospheric pressure, whereby the pressure difference needed for the filtering is formed by means of a suitable vacuum source, such as drop leg, vacuum pump or a centrifugal pump, inside the discs formed by sectors. Nevertheless, it is also possible to pressurize the whole filter, whereby the discs would be surrounded by elevated pressure The partial vacuum, or more generally, the pressure difference causes a solid lime mud layer to begin to form on the wire-coated surfaces of the sectors. Scrapers have been arranged at a pre-determined distance from the surface of the wire on both sides of each of the filter discs so as to scrape the thickened lime mud layer from the precoat layer when the thickened layer has increased sufficiently in thickness. The lime mud to be removed falls onto a belt conveyor located below the filter discs, the conveyor then further transporting the lime mud to, e.g. a lime mud reburning kiln.

The filtrate removed from the lime mud by means of partial vacuum into the inside of the filter discs is directed via a flow channel to the hollow main shaft and further to a filtrate tank. From the filtrate tank the filtrate is further pumped into the process.

As is known, the surface layer of the precoat becomes clogged while the filtering proceeds, and must be removed from time to time. The technique used most usually is to move the scrapers closer to the filter surface, whereby they cut the clogged surface layer of the precoat off. This, nevertheless, causes trouble in the lime reburning kiln, as the amount of lime mud to be transported to the kiln increases suddenly, and, additionally, the dry solids content of the lime mud changes dramatically.

When the situation is such that the whole of the precoat layer is clogged, it must be removed completely. According to known technique, this is effected either by blowing air under the wire surface, i.e. inside the sector, or by washing the wire surface with water. These operations, like the partial removal of the precoat, cause problems in the operation of the lime reburning kiln. Namely, if the precoat is completely removed by blowing, the production of lime mud is interrupted temporarily, and the operation of the lime reburning kiln is disturbed. On the other hand, this necessitates the temporary feeding into the kiln of a larger, more dirty and damp portion of lime mud, which causes the end temperature of the kiln to decrease, which causes an increase in the energy consumption of the kiln.

If the precoat is removed by washing, the production is interrupted similarly, but because of its high water content the water-washed precoat cannot be transported to the lime reburning kiln, whereby the feed to the kiln is interrupted for a longer period than by removing the precoat by-blowing. Additionally, washing the precoat dilutes the thickness of the lime mud in the tank, which necessitates a separate, larger lime mud tank to eliminate the changes in thickness. In any case, the removal of precoat by washing with water decreases the capacity of the filter.

The international patent application PCT/FI94/00134, the disclosure of which is included herein in its entirety, deals with solutions to similar problems in drum filters. The above-mentioned publication explains in detail, how the precoat layer is needed especially in the filtering of lime mud, onto which the actual lime mud is thickened. Further, the PCT-application deals with various ways to prevent clogging of the precoat layer.

A way of cleaning the filtering drum by utilizing at least one jet of liquid so that at least one low-pressure jet of liquid moving longitudinally across the drum is used to loosen a strip of the thickened lime mud before the lime mud cake is removed from on top of the precoat by means of a scraper is disclosed as the invention in the above-mentioned patent application. Further, the jet is used to remove a portion of the precoat layer. According to said invention, a high-pressure jet of liquid is advantageously used to remove a strip of the whole thickness of the precoat layer while the surface of the strip of the filter drum is cleaned by means of another high-pressure jet of liquid before the lime mud cake is removed from on top of the precoat by means of a scraper.

The present invention relates to utilizing the technique disclosed in the above-mentioned publication in connection with a disc filter. As with drum filters, the jets in disc filters can also be located either under the scrapers or on the same side of the disc as the nozzles for washing the dried lime mud.

As advantages of using a disc filter for filtering lime mud the following factors, among others, can be mentioned:

the size of the needed apparatus is smaller than that of a drum filter having the same filtering capacity;

maintaining the rated filtering capacity in severe process conditions due to a fast change of clogged precoat (the filtering surface of the sector is short, 0.6–1 m, whereby the jet cleans the surface in a short time compared to a drum filter, the length of the filtering surface of which is 5–12 m.) The result is that the disc filter can be rated for a higher surface load than a drum filter, which reduces the size of the filter;

no massive, traversing mixer is needed in the filter vat;

apparatuses having a high filtering capacity can easily be constructed;

almost the whole of the filtering capacity range of drum filters can be covered with discs of a single size in diameter, which results in savings brought about by serial/modular construction in manufacturing, lighter blocks, thereby easier to handle, no massive large pools and no large drums demanding high construction accuracy (e.g. diameter 5 m, length 12 m);

transport sizes are essentially reduced;

the small size of the sectors enables a metal wire to be used;

heavy equipment is not needed for moving the nozzles, because the maximal traversing distance of the nozzles is only about 1 meter, compared to distances of over 10 meters in drum filters;

easier construction techniques than with drum filters, and exploitation of module technique in manufacture and rating for the mill. It is easy to rate the apparatus for different uses, as both the discs and the vats surrounding them are series-produced components, any number of which can be connected sequentially.

The disc filter according to the invention can also be used for filtering green liquor. Because the filtering is advantageously effected by means of partial vacuum, the green liquor is cooled down, wherefore no separate green liquor cooler is needed prior to slaker-classifier. The fast method of changing the precoat also facilitates uninterrupted operation, which further optimizes the prerequisites for filtering the green liquor, a task usually very difficult to effect. A further advantage is also the small size of the equipment.

The above-mentioned drawbacks of the prior art equipment are eliminated and the above listed advantages are achieved by means of the method and apparatus according to the invention, the characterizing features of which are disclosed in the appended claims.

BRIEF DESCRIPTION OF THE DRAWINGS

In the following, the method and apparatus according to the invention are disclosed in more detail by way of reference to the enclosed drawings, of which

DETAILED DESCRIPTION OF THE DRAWINGS

Figure 1:
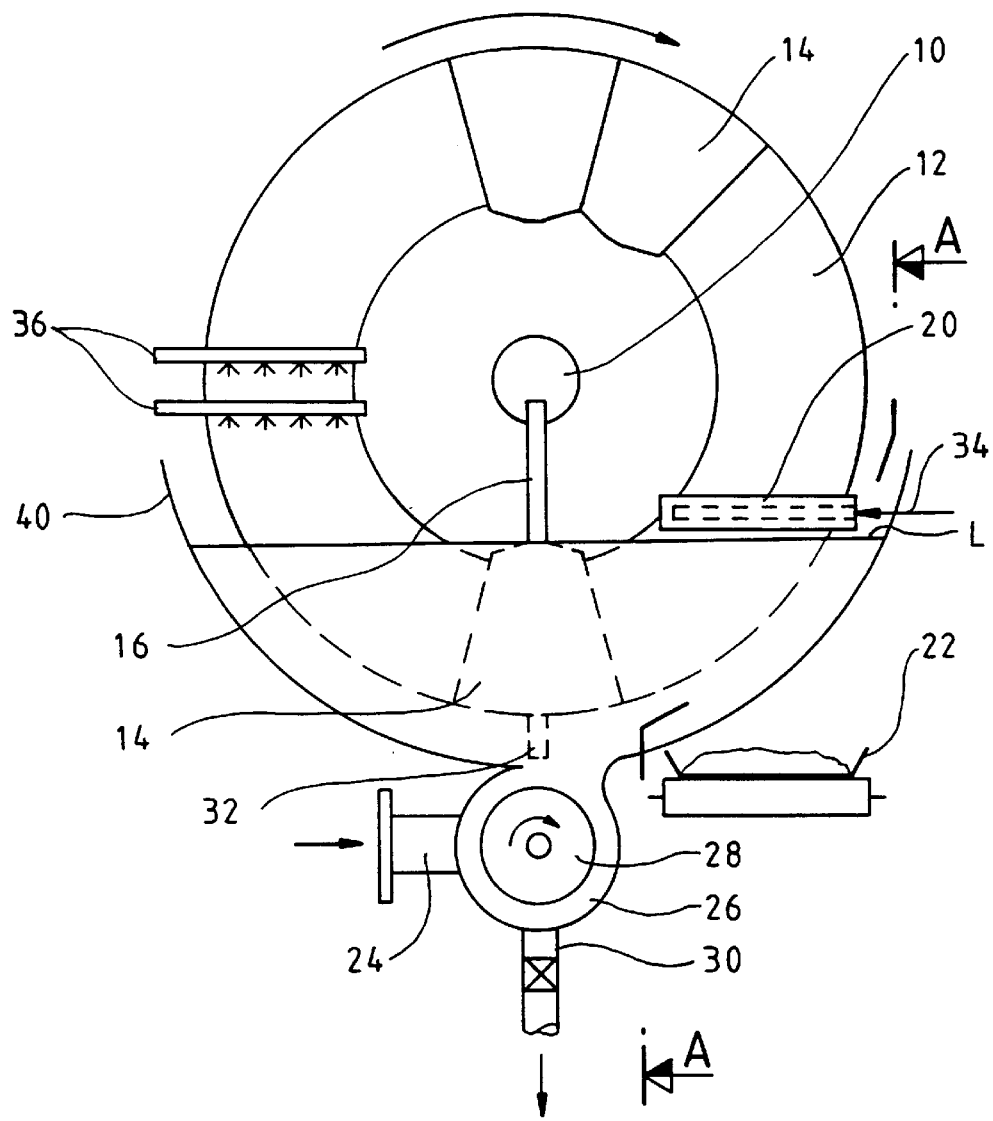
FIG. 1 is a disc filter according to the invention as a schematic cross section, perpendicular to the shaft of the filter.
Figure 2:
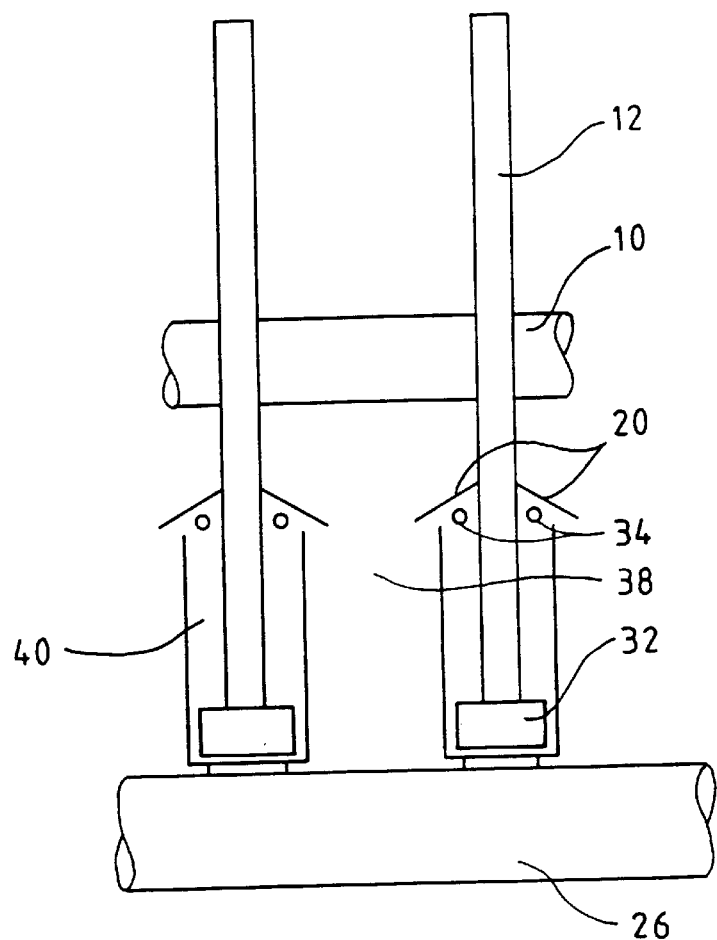
FIG. 2 is a disc filter according to an advantageous embodiment of the invention in section along the line A—A of FIG. 1.

As FIGS. 1 and 2 show, a disc filter according to the invention comprises a shaft 10, either hollow or otherwise provided with filtrate flow ducts, a plurality of radial filter discs 12 arranged on the shaft, the discs in turn comprising wire-coated sectors 14 known per se, and filtrate tubes 16 leading from the sectors to the shaft, more accurately filtrate tubes connecting the inside of the sectors to the flow duct or to the inside of the shaft, the apparatus being connected to driving equipment, such as a motor, reduction gear etc. (not shown) The shaft 10 of the filter is provided with bearings and supported at both of its ends by a separate support arrangement, the driving equipment being arranged in connection therewith. Each of the filter discs 12 in the embodiment of the figures is surrounded by a trough 400 The material to be treated, i.e. lime mud, in the trough 40 is at the least so high as to cover the whole of the sector 14 when in its bottom dead center. Usually, there is one trough 40 for each filter disc, even if the use of a large, single trough is advantageous in some cases. A scraper 20 provided with a hard metal tip is arranged on both sides if the filter disk, slightly above the liquid surface L of the trough 40 for removing the material thickened on the surface of the filter disc It is advantageous to arrange the scrapers 20 as near to the liquid surface L as possible, whereby the drying time for the material is maximized. The scrapers are naturally located so that the wire surface is submerged almost immediately after the dried lime mud has been removed. From the scrapers 20 the thickened material is led to openings 38 isolated from the troughs, and from the openings the material is allowed to fall on a belt conveyor 22 or a corresponding transport means for further transportation Naturally, it is also possible to remove the material by other means, such as a belt acting as a conveyor and located on the shaft of the apparatus between the discs, as disclosed in U.S. Pat. No. 4,943,372. Lime mud feed means have been arranged at the bottom of the troughs 40, comprising at least one feed duct 24, a dividing tube 26 having a conveyor screw or corresponding mixing means 28 with driving means (not shown) The dividing tube 26 spans the whole length of the filter so that the feed duct 24 is located on one end of the dividing duct 26. The purpose of the conveyor screw 28 or the like means is to transport lime mud evenly on the whole length of the filter to the trough-like vats 400 Additionally, the dividing tube is provided with a discharge duct 30 having a shutter valve, through which the troughs 40 can be emptied, if desired. Another component characteristic of a lime mud filter is the mixer bar 32, located on the periphery of each sector 14 so that it stirs the lime mud on the bottom of each of the troughs, thereby preventing lime mud from concentrating on the bottom of the trough. On the opposite side of the scraper 20 of the filter, i.e. on the side where the lime mud thickened on the wire surfaces rises from the lime mud, is advantageously one or more nozzles 36 for washing the thickened lime mud for each half of disc, for washing excess liquor from the lime mud cake.

Additionally, the apparatus according to the invention advantageously comprises nozzle arms 34, arranged so as to be able to perform a reciprocating motion for washing and/or removing the precoat and/or washing the wire surface, the arms 34 with their nozzles being advantageously located in the embodiments of FIGS. 1 and 2 below each scraper 20. The advantage achieved by locating the nozzles below the scrapers 20 is that when utilizing partial vacuum in filtering, no vacuum losses are caused through the washed wire surface having no precoat layer, because the washed wire surface is submerged practically immediately into the lime mud in trough 40 to form a new precoat layer.

Figure 3:
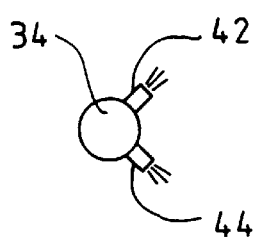
FIG. 3 is an advantageous nozzle arrangement according to the invention.
Figure 4:
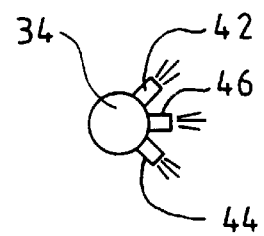
FIG. 4 is another advantageous nozzle arrangement according to the invention.
Figure 5:
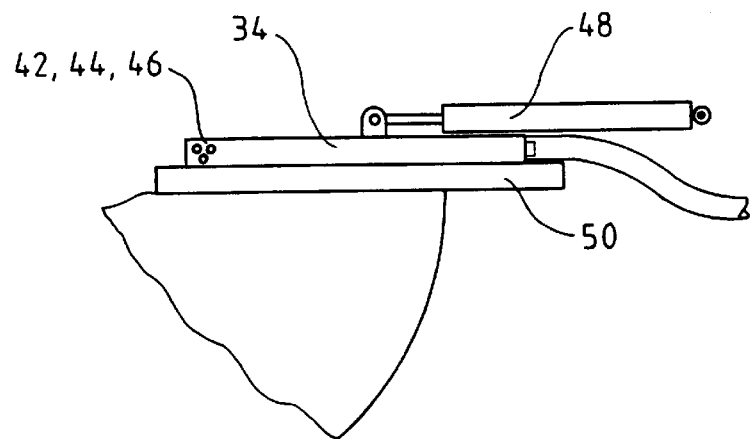
FIG. 5 is an advantageous nozzle arm arrangement according to the invention
Figure 6:
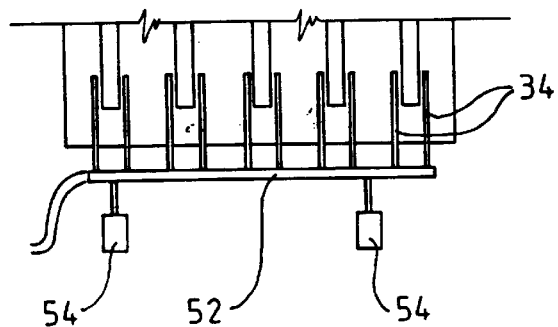
FIG. 6 is another advantageous nozzle arm arrangement according to the invention.

The function of the high-pressure discharge jet 42 showed in closer detail in FIGS. 3 and 4 is to remove the clogged precoat layer from the wire surface at desired intervals The high-pressure washing jets 44 are then used to clean the wire surface. The nozzles 42 and 44 are advantageously attached to the end of the nozzle arm 34, the arms 34 being either one per each half of the filter disc, or then the nozzle arms 34 located between the discs 12 can comprise nozzles to clean and wash the filter surface from both of their sides, i.e. opposing filter surfaces of adjacent filter discs. The nozzle arms 34 can be arranged to be independently movable by means of each having a hydraulic or pneumatic cylinder 48 or a toothed rack (as is shown in FIG. 5) Thereby it is simple to arrange the guide rail 50 of the nozzle arm 34 to be supported by, for example, the upper edge of the trough 18, whereby the rail also supports the trough. It is also possible to have at least a portion of, preferably all of the nozzle arms 34 of the filter attached to a common chassis rail 52 or the like, the rail being moved by means of the above-mentioned driving means, as is shown in FIG. 6. This way, it is simple to arrange, in connection with the chassis rail, collective wash/discharge liquid ducts for all nozzles.

If separate nozzle arms are arranged for each disc half, it is possible to connect their movement so that all arms move in their own tempo, or so that arms on both sides of a disc move in unison or that arms between adjacent discs move in unison.

Figure 7:
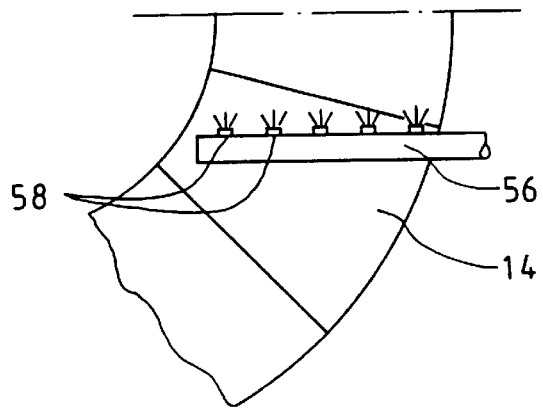
FIG. 7 is a third advantageous nozzle arm arrangement according to the invention.

It is also possible to arrange, as in FIG. 7, the nozzle arms 56 immovably under the scrapers which naturally means that there must be numerous nozzles 58 for each usage in order to have the whole of the surface of the sector 14' evenly cleaned. When the nozzles 58 are immovably located under the scrapers so that they wash the whole width of the filtering surface at a time, it is possible to arrange the cleaning so that the precoat of only one filter is removed at a time, the filter surface being cleaned simultaneously. Naturally, it is also possible to arrange the cleaning of numerous, or all discs, if desired, to be effected simultaneously The apparatus according to the invention operates so that lime mud is fed from inlet duct 24 to the dividing duct 26, in which a transport means 28, either screw-like or comprising blade-like mixing means, divides the lime mud evenly into the troughs 40 surrounding the lower parts of the disc filters 12. The mixer bars 32 located on the perimeter of the filter sectors 12 prevent the lime mud from thickening onto the bottom of the trough 40 by keeping the lime mud in constant motion. Either hydrostatic pressure or a partial vacuum arranged inside the filter discs 14 causes lime mud to be thickened onto the wire surface of the filter sectors 12. During the start-up of the machine and also after the wire surfaces of the filter discs 12 have been washed, a so-called precoat-layer is formed onto the wire surface, the thickness of which is in practice determined by the distance of the scraper 20 from the wire surface. The actual lime mud cake is then formed on the precoat until the lime mud cake rises from the vat. Excess liquor can be washed away from the lime mud cake by means of washing nozzles 36 and the lime mud cake can be further dried until the cake is cut off from the precoat by means of scrapers 20 arranged on both sides of the filter disc 12. The liquid filtered from the lime mud is directed through the central shaft 10 into a filtrate tank or the like (not shown), the shaft 10 being hollow or provided with other kinds of flow ducts.

When clogging of the precoat is noted, i.e. when the amounts of both the filtrate and the thickened lime mud start to considerably reduce, the high-pressure precoat discharge nozzles 42, at a pressure of about 30–100 bar, are turned on for removing the precoat either from the whole of the radial distance of the sector 14, i.e. in practice, during one revolution of the disc 12 the whole precoat is removed (unmovable nozzles), or to remove a narrow strip of about 10–50 mm at a time (movable nozzles), whereby more revolutions of the filter are needed to remove the whole of the precoat. The wire surface is cleaned by means of high-pressure washing jets 44 immediately after the precoat has been removed.

According to a further developed embodiment it is possible to provide the cleaning unit of the wire surface, or actually the nozzle arm 34, with at least another nozzle 46 for the third purpose of continuously washing the precoat layer after the lime mud cake has been removed by the scraper 20. The nozzle 46 is advantageously a low-pressure one, having a pressure of 2–30 bar, with the purpose of only slightly to trim the precoat by removing the clogged surface layer and keeping the bottom layer porous. The aim of using this third nozzle 46 is to reduce the need for renewing the whole of the precoat, thereby minimizing the possible disturbances caused by the clogging of the precoat to the operation of the filter or the lime mud reburning kiln.

The above goes to show that a new type of disc filter has been developed for filtering lime mud. In the above, only some advantageous embodiments of the filter have been described, the meaning of which is by no means to limit the scope of our invention from what the appended claims solely define as the scope of the invention.

We claim:

1. A method of thickening lime sludge utilizing a disc filter assembly comprising a plurality of disc filters, which disc filters rotate about a substantially horizontal axis into contact with lime sludge in a trough surrounding the disc filters, the disc filters each having wire surfaces extending substantially perpendicular to the axis of rotation, said method comprising the steps of:

(a) rotating the disc filter assembly about the axis of rotation so that the wire surfaces of the disc filters come into contact with lime sludge in the trough and then move out of the trough so that a precoat filter layer is formed on the wire surfaces and a dried layer of lime sludge collects on the precoat layer;

(b) scraping the dried layer of lime sludge from the precoat layers on the disc filter wire surfaces; and (c) without interrupting steps (a) and (b), at spaced points in time substantially removing the precoat layer from a wire surfaces by directing one or more high pressure jets of liquid at the precoat layer on the wire surface after scraping of the dried layer of lime sludge from the precoat layer.

2. A method as recited in claim 1 wherein step (c) is practiced by directing a first high pressure jet of liquid onto each wire surface to remove the precoat layer from the wire surface, and by then directing a second high pressure jet of liquid onto the wire surface to clean the wire surface itself.

3. A method as recited in claim 2 wherein step (c) is practiced immediately after step (b) by one or more high pressure jets positioned directly below where the dried layer of lime sludge was removed from the precoat layer.

4. A method as recited in claim 1 wherein step (c) is practiced by directing the one or more jets at a pressure of between about 30–100 bar.

5. A method as recited in claim 4 comprising the further step (d) of removing only a portion of the precoat layer by directing a low pressure jet of liquid at a portion of the wire surface.

6. A method as recited in claim 5 wherein step (d) is practiced by directing a jet of liquid at a pressure of between 2–30 bar, and less than the pressure of the jet or jets utilized in the practice of step (c), at the wire surface.

7. A method as recited in claim 6 wherein step (d) is practiced substantially continuously.

8. A method as recited in claim 1 wherein step (d) is arrested at the spaced points in time when step (c) is practiced.

9. A method as recited in claim 1 wherein the wire surface has a radial width, and wherein step (c) is practiced to remove the entire thickness of the precoat layer from the radial width at one time.

10. A method as recited in claim 1 wherein step (c) is practiced to remove only a narrow strip of the precoat layer at one time.

11. A method as recited in claim 10 wherein step (c) is further practiced by reciprocating the one or more jets of liquid as they are directed toward the wire surface.

12. A method as recited in claim 11 wherein a plurality of nozzles are provided for the practice of step (c), and wherein step (c) is practiced by moving all of the nozzles substantially simultaneously together.

13. A method as recited in claim 11 wherein a plurality of nozzles are provided for the practice of step (c), and wherein step (c) is practiced by moving the nozzles in individual groups.

14. A method as recited in claim 11 wherein a plurality of nozzles are provided for the practice of step (c), and wherein step (c) is practiced by moving the nozzles individually, one at a time.

15. A method as recited in claim 1 wherein step (c) is practiced immediately after step (b) by one or more high pressure jets positioned directly below where the dried layer of lime sludge was removed from the precoat layer.

16. A disc filter assembly comprising:

a plurality of filter discs each having a plurality of sectors and formed by first and second spaced wire surfaces, defining an interior volume;

a trough for maintaining a suspension level in the interior thereof;

a substantially horizontal shaft mounting said filter discs for rotation within said trough so that said discs are horizontally spaced from each other, having an inter-disc volume therebetween, and so that a portion of each of said discs is disposed within said trough to contact suspension therewithin;

a plurality of filtrate tubes for connecting the interior volumes of said filter discs to said shaft;

means for feeding suspension to said trough;

means for discharging thickened suspension from said trough, said discharge means including a scraper cooperating with each wire surface of each filter disc; and at least one nozzle positioned directly below each of said scrapers for directing a jet of liquid at said wire surface with which said scraper is cooperating.

17. A disc filter assembly as recited in claim 16 wherein said at least one nozzle comprises two high pressure nozzles.

18. A disc filter assembly as recited in claim 16 wherein said at least one nozzle comprises two high pressure nozzles and a low pressure nozzle.

19. A disc filter assembly as recited in claim 16 wherein said at least one nozzle is immovably positioned directly below said scraper.

20. A disc filter assembly as recited in claim 16 further comprising a nozzle arm fastened to said at least one nozzle, and means for reciprocating said nozzle arm, and said at least one nozzle connected thereto, in a radial direction with respect to said shaft.

21. A disc filter assembly as recited in claim 20 wherein said reciprocating means comprise a hydraulic cylinder, pneumatic cylinder, or toothed rack.

22. A disc filter assembly as recited in claim 20 wherein a pair of nozzle arms, associated with the same filter disc, are connected to a single reciprocating means, to be reciprocated together.

23. A disc filter assembly as recited in claim 16 wherein said trough has a width; and wherein said means for feeding suspension to said trough comprises an inlet duct and a dividing tube connected to said inlet duct, and spanning substantially the entire width of said trough, said dividing tube having a mixing means therein.

24. A disc filter assembly as recited in claim 16 wherein said means for discharging thickened suspension from said trough further comprises a discharge conveyor for receiving thickened suspension from said scrapers.

25. A disc filter assembly as recited in claim 16 wherein said trough has a bottom, and wherein said filter discs each have a circumferential periphery; and further comprising mixing means on said circumferential peripheries of said filter discs for preventing suspension from thickening on said bottom of said trough.

* * * * *